(12) United States Patent
Ikeda (10) Patent No.: US 8,856,393 B2
(45) Date of Patent: Oct. 7, 2014

(54) MULTIFUNCTIONAL TOUCH-ENABLED DEVICES

(75) Inventor: Akihiko Ikeda, Taipei (TW)

(73) Assignee: Hewlett-Packard Development Company, L.P., Houston, TX (US)

( * ) Notice: Subject to any disclaimer, the term of this patent is extended or adjusted under 35 U.S.C. 154(b) by 240 days.

(21) Appl. No.: 13/092,730

(22) Filed: Apr. 22, 2011

(65) Prior Publication Data

US 2012/0271969 A1    Oct. 25, 2012

(51) Int. Cl.
*G06F 3/00*  (2006.01)
*G06F 17/00* (2006.01)
*G06F 3/041* (2006.01)
*G06F 3/038* (2013.01)
*G06F 3/0354* (2013.01)
*G06F 3/147* (2006.01)

(52) U.S. Cl.
CPC .............. *G06F 3/038* (2013.01); *G06F 3/0416* (2013.01); *G06F 3/147* (2013.01); *G06F 3/03547* (2013.01)
USPC ............................................ 710/14; 715/201

(58) Field of Classification Search
CPC ..... G06F 3/0484; G06F 3/048; G06F 3/0487; H04N 21/4126
USPC ......................................................... 710/14
See application file for complete search history.

(56) References Cited

U.S. PATENT DOCUMENTS

| | | | |
|---|---|---|---|
| 6,225,984 B1 * | 5/2001 | Crawford | 345/173 |
| 6,727,891 B2 | 4/2004 | Moriya et al. | |
| 2004/0004603 A1 * | 1/2004 | Gerstner et al. | 345/169 |
| 2004/0133857 A1 * | 7/2004 | Wu et al. | 715/527 |
| 2008/0307096 A1 * | 12/2008 | Wang et al. | 709/227 |

OTHER PUBLICATIONS

Use PDA as external touch screen monitor, Oct. 11, 2007, fixunix.com.*
Innobec SideWindow 1.02, Mar. 20, 2006, Innobec.*
Palm-size PC—User's Guide, 1999, Casio Computer.*
Adam Fendelman, How are cell phones different from smartphones?, About.com, no dates given on the article but article was about smartphone of 1992 and cell phones of 1973.*
Title: Asus Dual Screen Laptop;http://arbertechno.blogspot.com/2010/01/asus-dual-screen-laptop.html; Publication Date: Jan. 10, 2010.
Title: External Touch Screen Laptop: http://arbertechno.blogspot.com/2010/01/external-touch-screen-laptop.html ; Publication Date: Jan. 7, 2010.

* cited by examiner

*Primary Examiner* — Hyun Nam
(74) *Attorney, Agent, or Firm* — Milin Patel (57) ABSTRACT

Example embodiments disclosed herein relate to multifunctional touch-enabled devices. A device includes a touch-enabled display. The device further includes an external connection to connect to a graphics bus of a computing device or an input bus of the computing device. The device also includes a selection module to determine a mode of the peripheral device from a plurality of modes. The modes include a display mode in which the device identifies itself to the computing device as a display. The modes also include an input mode in which the peripheral device identifies itself to the computing device as a dedicated input device.

19 Claims, 4 Drawing Sheets

MULTIFUNCTIONAL TOUCH-ENABLED DEVICES

BACKGROUND

Manufacturers of devices are challenged to deliver quality and value to consumers, for example by providing features to users that make the devices usable and functional. Example devices include slate computing devices, mobile phones, and electronic book readers. These devices may not include all of the features a user desires. Peripheral devices, such as keyboards, mice, printers, displays, etc., can be utilized to add features to improve the usefulness of the devices.

BRIEF DESCRIPTION OF THE DRAWINGS

The following detailed description references the drawings, wherein.

DETAILED DESCRIPTION

Consumers today have many devices, such as mobile phones, computers, laptops, tablets, slates, etc. These devices may be customized to be appealing to users. For example, the devices may be customized to be small and/or lightweight. As such, the devices may be stripped of features, such as a keyboard, to minimize the weight or size. Users may miss these features in their devices or may wish to utilize features not included with the devices. However, for these users, carrying a device for each of these features may diminish the value or usefulness of the customization of the original devices. Further, users and device manufacturers may wish to take into consideration the cost of these extra devices.

Accordingly, various embodiments disclosed herein relate to multifunctional peripheral devices that can be used to implement one or more of these features. For example, many touch-based devices do not have a dedicated input such as a keyboard. The multifunctional peripheral device may thus be utilized as a dedicated input, such as a keyboard input, a touchpad input, etc. The peripheral device can include a touch-enabled display. The touch-enabled display can present a soft keyboard to the user. The user can then provide input via the touch-enabled display. The input is then transmitted to the host device. Further, the input can be transmitted via a wired or wireless connection (for example, a Universal Serial Bus connection) to the device.

In another example, many devices may have limited display space. These devices may have the limited display space to lighten the devices or make the devices smaller. The multifunctional peripheral device can be utilized to expand the display space of the devices. As such, display information can be transmitted from a host device to the multifunctional peripheral device for display.

The multifunctional peripheral device can include simple components to reduce size and weight. The use of simple components can additionally reduce the cost of production and/or sale to users. Moreover, the multifunctional peripheral device can rely on a host device for which the peripheral device expands features and be customized to provide the specific features. As such, a high-level operating system need not be utilized.

In certain embodiments, the multifunctional peripheral device may be the size of a mobile phone or tablet to provide features for similarly sized devices. In other embodiments, the peripheral device can include a case that can be utilized to cover both the peripheral device and the host device. For example, a touch-enabled display can be on one side of a cover and when a user wishes to utilize the display, the user can open the cover. The opening of the cover can be utilized to turn the peripheral device to an active mode, such as a soft keyboard mode. In certain scenarios, more than one mode can be activated for a particular host device.

Figure 1A:
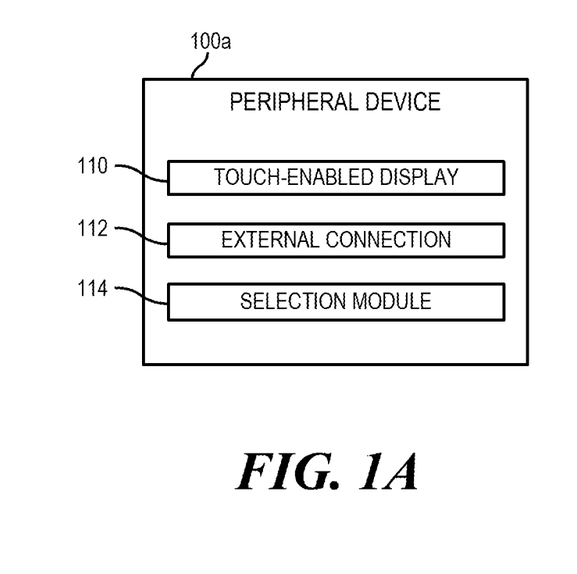
FIGS. 1A and 1B are block diagrams of a multifunctional touch-enabled peripheral device, according to various examples.
Figure 1B:
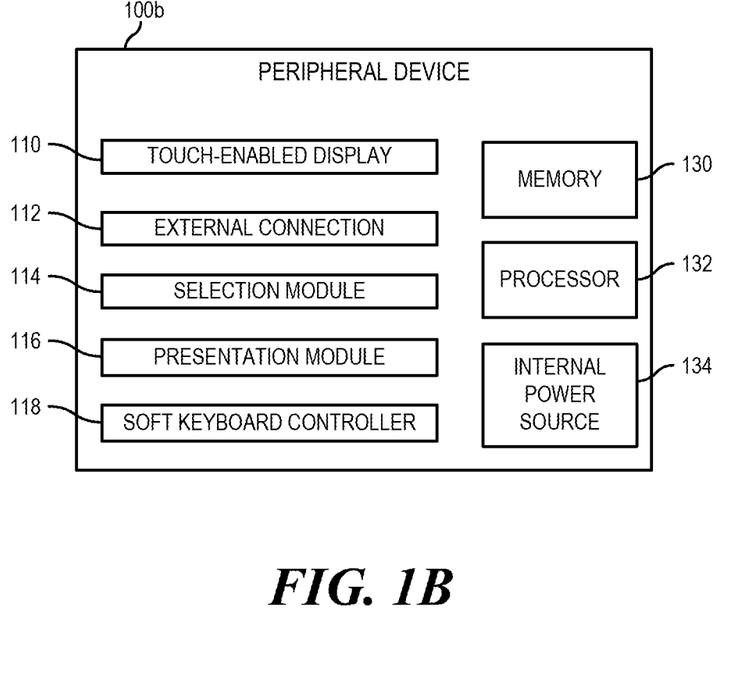

FIGS. 1A and 1B are block diagrams of a multifunctional touch-enabled device, according to various examples. Peripheral devices 100a, 100b include modules that can be utilized to add features to a host device. The respective peripheral devices 100a, 100b may be a device that can provide input to a host device as well as provide a display for the host device or another host device. The peripheral devices 100a, 100b can include a touch-enabled display 110 to present information, such as graphical information received from a graphical bus of the host device, a soft keyboard utilized for input, or the like. An external connection 112 can be utilized to connect to a host device for which the peripheral device can add functionality to. A processor, such as a central processing unit (CPU), a graphics processing unit (GPU), or a microprocessor suitable for retrieval and execution of instructions and/or electronic circuits can be configured to perform the functionality of any of the modules 114, 116 described below. In some embodiments, the peripheral devices 100a, 100b can include some or all of the components and/or additional components. Further, in certain embodiments, some components can be utilized to implement functionality of other components described below.

The peripheral device 100 can be used to expand the capabilities of one or more host computing devices. Further, the peripheral device 100 can be independent of the core computer architecture of the host computing devices. In certain embodiments, the core computer architecture of a host computing device is the fundamental operating structure of the host computing device that describes the functional description of requirements and design implementations for parts of the host computing device. As such, the peripheral device 100 can expand on a first capability of a first host computing device and a second capability of a second host computing device. Moreover, the peripheral device 100 may include a simple user interface, such as a menu user interface providing selection elements, if not connected to a host computing device. For example, the peripheral device 100 may not include a higher level or complex operating system such as Windows®, Android®, webOS™, Linux, etc. A manufacturer of the peripheral device 100 can save cost of manufacturing the peripheral device because any processors of the peripheral device 100 need not be computationally powerful. As such, cheaper or specialized processors and/or control logic can be used. For example, a specialized keyboard controller or graphical array may be cheaper than a general purpose processor with multiple capabilities. Some of the capabilities of the general purpose processor may be unused and thus an unnecessary cost.

As detailed below, peripheral devices 100a, 100b may include a series of components 110-118 for expanding capabilities of other devices. Each of the modules 114, 116 may include, for example, hardware devices including electronic circuitry for implementing the functionality described below. In addition or as an alternative, each module 114, 116 may be implemented as a series of instructions encoded on a machine-readable storage medium stored in a memory 130 of respective peripheral devices and executable by a processor 132. It should be noted that, in some embodiments, some modules 114, 116 are implemented as hardware devices, while other modules are implemented as executable instructions. Further, a peripheral device 100b can include an internal power source 134, such as a battery, to provide power to the peripheral device 100b.

In certain embodiments, a touch-enabled display 110 is a visual display that can detect the presence and location of a touch with an area of the display. Various technologies can be utilized to implement the display, for example, liquid crystal display technology, plasma display technology, light-emitting diode technology, etc. Further, multiple technologies can be utilized to implement touch sensing capabilities of the touch-enabled display, for example, resistive technology, capacitive technology, infrared technology, or the like.

An external connection 112 can be utilized to connect the peripheral device 100 to a host device that is utilizing functionality of the peripheral device 100. The external connection 112 can be a wired connection. Further, the external connection 112 may connect to a graphics bus of one host device. Additionally or alternatively, the external connection 112 can be used to connect the peripheral device 100 to an input bus of a host device. In certain examples, a bus is a subsystem that can be used to transfer data between computing devices. One or more protocols can be used by the buses. The external connection 112 to each type of bus can be different. For example, the peripheral device 100 can have an external connection 112 with more than one port. Further, the external connection 112 can utilize a special interface or port to provide access to both buses. Thus, the external connection 112 can be via one or multiple connectors, and/or provide information via the same bus. As such, a single host device can be used to connect via the graphics bus as well as input bus. In one example, a universal serial bus (USB) may be utilized as a connection 112.

As noted above, the touch-enabled display 110 may be utilized to present graphical information. The graphical information can be received from the external connection 112. The external connection 112 may connect to, for example, a graphics bus of an associated host computing device. The peripheral device 100 can thus receive and display the graphical information. In certain scenarios, a presentation module 116 is utilized to process information received via the external connection 112 to display. In one example, the processing can be utilized to drive the display. In other scenarios, the display is driven directly by the graphical information.

In other examples, the touch-enabled display 110 can be used as an input source to provide input to a host device via the external connection 112. Thus, the external connection 112 can connect the peripheral device 100 to an input bus of the host device. Various types of input can be provided. For example, a keyboard input option, a keypad input option, a pointing device option (for example, a mouse pointer option), or the like can be provided. In the example of a keyboard or keypad input option, a soft keyboard controller 118 can be utilized to retrieve soft keyboard graphics information from memory 130 and cause presentation of the soft keyboard graphics information on the touch-enabled display 110 (for example, via the presentation module 116). When a user presses a key on the touch-enabled display 110, location information of the press can be transmitted to the soft keyboard controller 118. The soft keyboard controller 118 then maps the location of the press to a key. The key information is then sent to the host device.

A selection module 114 can be utilized to determine an operational mode for the peripheral device 100 from one of multiple possible operational modes of the peripheral device 100. The selection module 114 can be implemented using a hard or soft switch. Further, the selection module 114 can be implemented utilizing a combination of hardware components and software functionality. For example, a system of magnetic switches on the peripheral device 100 may be engaged when within proximity of a host device. The triggering of the switches can be utilized to determine the operational mode.

Further, the peripheral device 100 can include a case. The case can include a space for one or more host computing devices. The case can also be utilized to activate the switches. One operational mode can be a display operational mode. In this operational mode, graphical information can be received from the host device and presented via the touch-enabled display 110. The peripheral device 100, when in this operational mode, can identify itself to the host device as a display. Another operational mode can be an input operational mode. In this operational mode, the peripheral device 100 can act as an input mechanism (for example, a keyboard, a mouse, a keypad, etc.). Further, in the input operational mode, the peripheral device 100 can identify itself to the host device as a dedicated input device. In certain embodiments, a dedicated input device is a device whose primary purpose is to provide input. As such, when in this mode, the peripheral device 100 need not utilize a graphics bus. The identification can be more specific, for example, the peripheral device 100 can identify itself as a keyboard.

The identification can be based on a type of interface bus being utilized. An example of identification for a graphics bus can be extended display identification data (EDID). In the case of another type of bus, the identification can be via a packet header that identifies the peripheral device 100. Other modes of identification can be used based on a type of bus or communication protocols being utilized. For example, the identification can occur based on a handshake procedure based on a set of rules associated with the bus utilized to connect the peripheral device 100 to the host device.

In one example, the input operational mode includes a dedicated soft keyboard mode. The peripheral device 100 can thus identify itself to a host computing device as a keyboard. In this mode, the touch-enabled display 110 can be caused to display a soft keyboard. As noted above, the memory 130 can include graphical information associated with the soft keyboard to present. For example, a non-volatile memory of the peripheral device 100 can include information about one or more keyboards. The presentation module 116 can retrieve the graphical information associated with a particular keyboard to present via the touch-enabled display. When input from a user is received via the touch-enabled display 110, the soft keyboard controller 118 receives the input. The soft keyboard controller 118 can then determine an associated key based on the input. The determination can be based on a type of keyboard that is presented. For example, the peripheral device 100 can determine a language associated with the host computing device. The soft keyboard presented can be based on the determined language. As such, a different keyboard can be presented for an English-based host computing device and a Japanese-based host computing device. When the associated key is determined, the external connection 112 is used to transmit the associated key information to the input bus of the host device. Additionally, different types of keyboards and/or keypads can be used based on a type of host computing device.

In another scenario, the input operational mode includes a mouse or pointing device mode. As such, the touch-enabled display 110 can be utilized to receive touch input that can be used to generate pointing information, which can be used to control a pointer associated with the host computing device. Pointing information can be generated based on the touch input and transmitted via the external connection 112 to the host device.

In yet another scenario, the host computing device can be an electronic graphical information device, such as a text player (for example, an electronic book reader), a media player (for example, a video player, an image viewer, etc.), or the like. The selection module 114 can determine that the operational mode is a display operational mode. As such, the external connection 112 can be used to receive graphical information from a graphical bus of the host computing device. The graphical information is used by the presentation module 116 to present content via the touch-enabled display 110.

In some embodiments, the peripheral device 100 may also include independent modes. The peripheral device 100 may include one or more modes where the peripheral device 100 does not act as being dependent upon a host device. For example, when the peripheral device 100 is not connected to the host device, the peripheral device 100 may present a simple display, such as a clock or a media display (for example, the display of pictures stored in a memory of the peripheral device 100).

Figure 2:
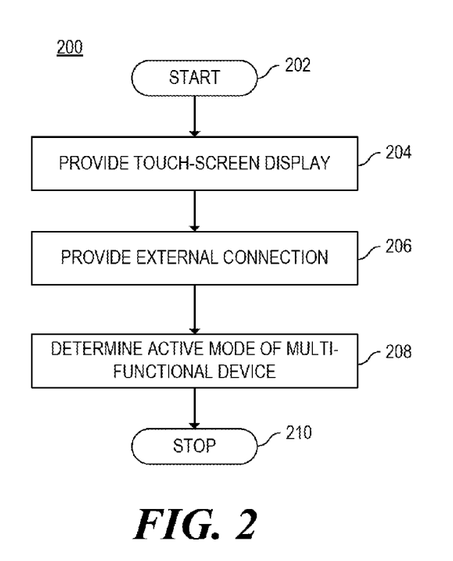
FIG. 2 is a flowchart of a method for determining an active mode of a multifunctional device, according to one example.

FIG. 2 is a flowchart of a method for determining an active mode of a multifunctional touch-enabled device, according to one example. Method 200 can be executed by a processor, controller, or other electronic logic of a peripheral device or other suitable components or modules. Additionally, components for executing the method 200 may be spread among multiple devices, for example, the device may include one or more sub devices. Method 200 may be implemented in the form of executable instructions stored on a machine-readable storage medium, and/or in the form of electronic circuitry. A machine-readable storage medium may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a flash storage, and the like. As such, the machine-readable storage medium can be non-transitory. The machine-readable storage medium can be utilized to implement low-level electronic features of one or more chips. Such features may include the transmission of information, control of one or more buses, etc.

Method 200 may start at 202 and proceed to 204, where a touch-screen display of a multifunctional device is provided. The multifunctional device can provide the touch-screen display by supplying power, supplying one or more control signals, and/or supplying graphical information to drive the touch-screen display. Access to the touch-screen display can thus be provided to a user of the multifunctional device.

The multifunctional device can also provide an external connection capable of connecting to a graphical bus of a computing device or an input bus of the computing device (at 206). The computing device can be considered a host computing device that utilizes the multifunctional device to extend its native capabilities. The provisioning of the external connection can be accomplished by supplying an interface between the multifunctional device and the computing device. The multifunctional device can also include one or more ports to provide the external connection. Further, in certain examples, the multifunctional device is not part of the core computer architecture of the connected computing device. As such, when connected, the multifunctional device can be operatively dependent on the connected computing device.

At 208, components of the multifunctional device can determine an active mode of the multifunctional device from multiple modes of the multifunctional device. One approach to determining the active mode is to have a switch on the multifunctional device selects the mode. Electrical components can determine that the switch has been utilized (for example, by monitoring a signal associated with the switch). The switch or multiple switches can also be activated by other means, such as a magnet. Another approach to determining the active mode is by selecting via a mode selector via the touch-screen display. Further, the active mode can be determined by the multifunctional device by an analysis of the external connection. For example, a signal can be received via the external connection that can be utilized to determine the active mode.

The modes can include a display mode in which the multifunctional device identifies itself to a device connected via the external connection as a display. When in the display mode, the multifunctional device can receive graphical information from the graphical bus of the connected device and present the graphical information on the touch-screen. The display mode can further utilize the touch functionality to provide touch-screen input.

The modes can also include an input mode in which the multifunctional device identifies itself to the connected device as a dedicated input device. The multifunctional device can be specific as to the type of input device it represents. For example, the multifunctional device can represent itself as a keyboard or a mouse. As such, the connected device can utilize the multifunctional device as the input device. This improves the compatibility of the multifunctional device because connected devices need not utilize a special driver to communicate. For example, a generic keyboard and/or mouse driver may be utilized to connect. Then, at 210, the method 200 stops. The multifunctional device may continue acting in the active mode.

In certain embodiments, the multifunctional device does not include a graphical user interface operating system to connect between a user and the multifunctional device to provide applications. Instead, a less complex user interface, for example, a menu user interface, can be provided to the user to select from options. Also, the multifunctional device can utilize user interfaces to interact with the host device. Some of these user interfaces can be controlled by the host device.

Figure 3:
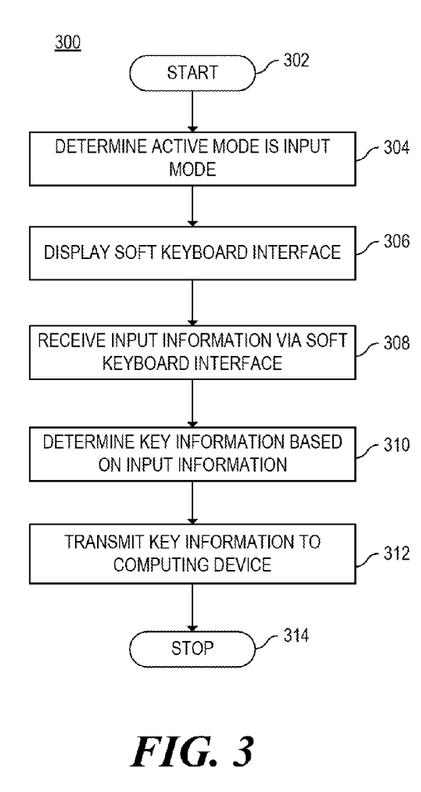
FIG. 3 is a flowchart of a method for providing an input mode of a multifunctional device, according to one example.

FIG. 3 is a flowchart of a method for providing an input mode of a multifunctional touch-enabled device, according to one example. The multifunctional touch-enabled device can be a peripheral device. Method 300 can be executed by a processor, controller, or other electronic logic of the device or other suitable components. Method 300 may be implemented in the form of executable instructions stored on a machine-readable storage medium, and/or in the form of electronic circuitry. The machine-readable storage medium can be utilized to implement low-level electronic features of one or more chips. Such features may include the transmission of information, control of one or more buses, etc. The peripheral multi-function touch-enabled device can be connected to a computing device.

The method 300 starts at 302 and proceeds to 304, where the method 300 determines that an active mode of a multifunctional device is an input mode. The active mode can additionally be considered a soft keyboard mode. In this mode, a soft keyboard interface is presented to a user of the multifunctional device and a keyboard interface is presented to a connected device.

At 306, the multifunctional device displays a soft keyboard via a touch-screen display, which can be a part of the multifunctional device. The soft keyboard can be customized based on region or language information associated with the connected computing device. The multifunctional device may have included a memory that stores different soft keyboard presentation information as well as different key mappings associated with the different soft keyboards. When a particular soft keyboard is selected, the multifunctional device can be identified as a keyboard associated with that type of input.

A user of the multifunctional device can input information via the soft keyboard. The multifunctional device can receive, at a soft keyboard controller, input information via the touch-screen display (at 308). The input information can be a location where the touch-screen was touched by the user. Then, at 310, the keyboard controller determines key information based on the input information. The key information can be a determined key based on a mapping of the location of the input information. In certain scenarios, a representation of the determined key is used in the key information to symbolize the key. In the example of a keyboard, an input corresponding to the letter 'A' can have a character or binary representation, for example keyboard scan code. At 312, the key information can be transmitted to the connected computing device. The key information may be transmitted via an external connection to an input bus associated with the connected device.

Figure 4:
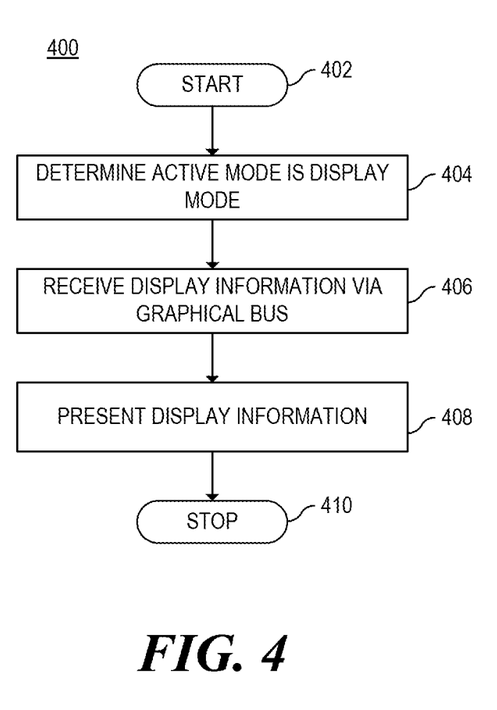
FIG. 4 is a flowchart of a method for providing a display mode of a multifunctional device, according to one example.

FIG. 4 is a flowchart of a method for providing a display mode of a multifunctional touch-enabled device, according to one example. The multifunctional touch-enabled device can be a peripheral device. Method 400 can be executed by a processor, controller, or other electronic logic of the device or other suitable components. The method 400 can be implemented by the multifunctional device utilizing various technologies.

The method 400 starts at 402 and proceeds to 404, where the method determines that an active mode of the multifunctional device is a display mode. As such, the multifunctional device identifies itself as a display to a connected computing device. In this mode, the multifunctional device can be connected to the connected computing device with an external connection. The external connection can be connected to a graphical bus or interface, for example, a video graphics array output or a digital visual interface output, of the connected computing device.

At 406, the multifunctional device receives display information via the graphical bus and external connection. The display information can be processed to be put into a format to drive a touch-screen display of the multifunctional device. The display information can be utilized to expand on a display of the connected computing device. For example, an e-book reader can utilize the touch-screen to view a page of a book. In another example, the multifunctional device can be used to present other graphical information from another type of computing device. Then, at 408, the multifunctional device presents the display information and/or processed display information to the user. The presentation can be accomplished by driving the touch-screen display based on the display information and/or processed display information. The method 400 then proceeds to 410, where the method stops.

Figure 5A:
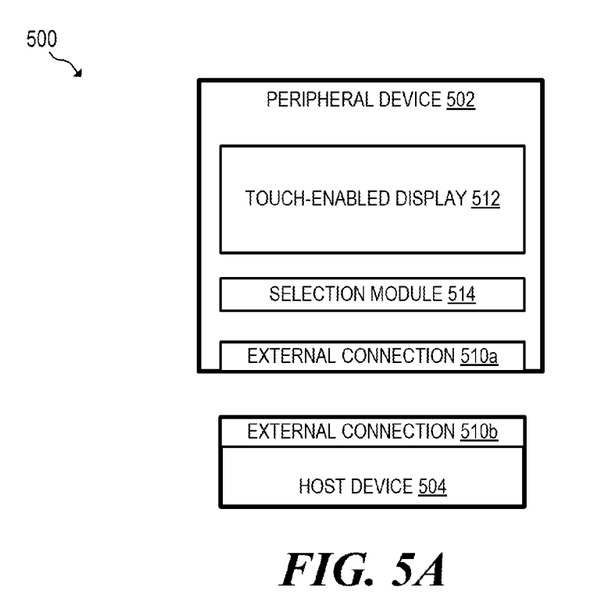
FIGS. 5A and 5B are block diagrams of a system including a peripheral device capable of multiple operational modes, according to various examples.
Figure 5B:
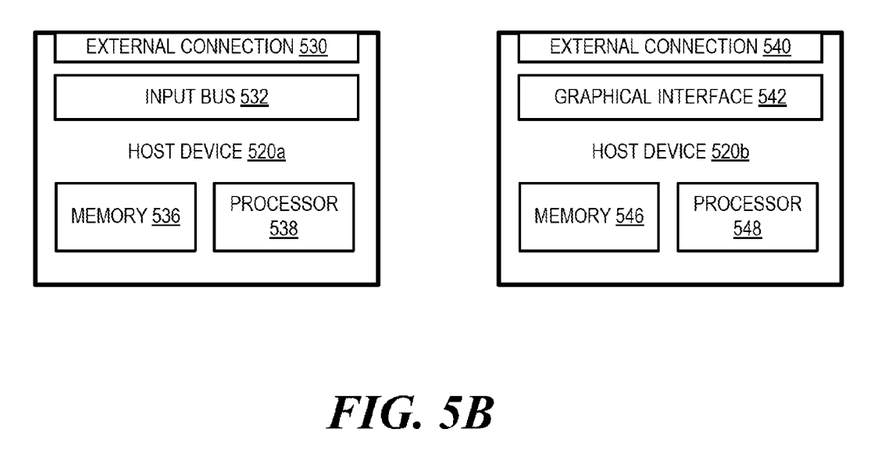

FIGS. 5A and 5B are block diagrams of a system including a peripheral device capable of multiple operational modes, according to various examples. The peripheral device 502 can be connected to a host device 504 via respective external connections 510a, 510b. The external connection 510 can be wired and may be utilized to provide communication between the peripheral device 502 and the host device 504. One or more buses can be utilized for the communications.

A touch-enabled display 512 of the peripheral device 502 can be used to provide features for the host device 504. Features can be associated with one or more modes of the peripheral device 502. Further, the peripheral device 502 may be functionally dependent on the host device 504 to implement the features. Some features can include display features that can be used to expand a display for the host device 504. Other features can include input features, such as the ability to utilize the touch-enabled display 512 as a keyboard, keypad, mouse, or other input mechanism. The input mechanisms can be used to provide dedicated input for some host devices 504. Examples of host devices 504 include tablet devices, slate devices, computers, mobile phones, navigation devices, electronic graphical information devices such as e-book readers and media players, etc.

A selection module 514 is utilized to select a mode from multiple modes of the peripheral device 502. When a mode is selected, one or more features associated with the mode can be provided by the peripheral device 502 for a connected host device 504, for example, host devices 520a or 520b. The mode can be selected via a hardware switch or a logical switch or other selection mechanism. Example modes include an input mode (for example, a keyboard mode, a keypad mode, a pointer mode, etc.) a display mode, combinations thereof, or the like. After a mode is determined for a connected host device 520a, 520b, the peripheral device 502 transmits identification information to the connected host device based on the mode.

In one example, the selected mode is the input mode, for example, a keyboard mode. In this mode, the identification information indicates that the peripheral device is a keyboard. As such, a host device 520a connected via an external connection 530 to the peripheral device 502 will think that a keyboard is connected to an input bus 532 of the host device 520a. A memory 536 and processor 538 of the host device 520a can determine that the peripheral device 502 is a keyboard. Further, the peripheral device 502 can represent itself as a general keyboard so that special drivers need not be utilized on the host device 520a. In other input modes, the peripheral device 502 can represent itself as other devices.

When in the keyboard mode, the touch-enabled display 512 can be caused to present a soft keyboard. A memory of the peripheral device 502 may be used to store graphical information of the soft keyboard. A user can enter input via a touch at the touch-enabled display 512. A soft keyboard controller of the peripheral device 502 may receive the input. The soft keyboard controller then converts the input to key information. In certain embodiments, the key information is a key associated with the touch. This can be determined based on a mapping of the area touched (for example, as X-Y coordinates) that can be compared with keys displayed on the touch-enabled display 512. The key information is then transmitted to the host device 520a via the input bus 532 and external connection 510a, 530.

In another example, the selected mode is a display mode. In this mode, host device 520b is connected to the peripheral device 502 via external connection 510a, 540. External connection 540 can be associated with, at least in part, a graphical interface 542 of the host device 520b. The host device 520b may have its own computer architecture separate from the peripheral device 502. This architecture can include memory 546 and at least one processor 548. When the display mode is selected, the peripheral device 502 transmits identification information to the host device 520b indicating that the peripheral device is a display. For example, the peripheral device 502 may indicate that it is a monitor with one or more resolution options. As such, the host device 520b can drive graphical information, via the graphical interface 542 to the peripheral device 502 to utilize the display space. In one scenario, the host device 520b is an e-book reader. In this scenario, the graphical interface 542 can drive the touch-enabled display 512 to present additional information, for example, a page of a book.

For explanatory purposes, the capabilities of host devices 520a, 520b are separated, however, it is contemplated that the host devices 520a, 520b can include both an input bus 532 and a graphical interface 542. Further, it is contemplated that a single host device 504 can be capable of utilizing multiple modes of operation of the peripheral device 502.

In certain examples, the display mode can further be a touch-enabled display mode. In these examples, the touch-enabled display 512 is also utilized for input. For example, the touch-enabled display 512 can display selectable display elements. A user can provide input via the touch-enabled display 512. The input can be sent to the host device 520b via an input bus 532. Then, the host device 520b can perform a function based on the input.

What is claimed is:

1. A peripheral device comprising:
   a touch-enabled display;
   an external connection to connect to at least one of: a graphics bus of a computing device and an input bus of the computing device; and
   a selection module to select one operational mode from a plurality of operational modes of the peripheral device including a display operational mode and an input operational mode,
   wherein when selected the display operational mode operates exclusively from the input operational mode and the peripheral device identifies itself to the computing device as a display, and wherein when selected the input operational mode operates exclusively from the display operational mode, the peripheral device identifies itself to the computing device as a dedicated input device and the peripheral device communicates with the computing device independently of the graphics bus of the computing device.

2. The peripheral device of claim 1, further comprising:
   a soft keyboard controller,
   wherein the input operational mode includes a dedicated soft keyboard mode, and
   wherein, if the dedicated soft keyboard mode is the one operational mode, the touch-enabled display is caused to display a soft keyboard.

3. The peripheral device of claim 2, further comprising:
   a non-volatile memory; and
   a presentation module,
   wherein the presentation module retrieves graphical information associated with the soft keyboard from the non-volatile memory, and
   wherein the presentation module presents the soft keyboard via the touch-enabled display.

4. The peripheral device of claim 3,
   wherein the soft keyboard controller receives input via the touch-enabled display,
   wherein the soft keyboard controller determines a key based on the input, and
   wherein the external connection is used to transmit the key to the input bus.

5. The peripheral device of claim 3,
   wherein the peripheral device determines a language utilized with the computing device, and
   wherein the presentation of the soft keyboard is based on the language.

6. The peripheral device of claim 1, further comprising:
   a presentation module,
   wherein the computing device is an electronic graphical information device,
   wherein the selection module selects the display operational mode, and
   wherein the presentation module receives graphical information from the graphical bus.

7. The peripheral device of claim 1,
   wherein the external connection is used to transmit a pointing information via the input bus during the input operational mode.

8. The peripheral device of claim 1, wherein the peripheral device includes a case, and wherein the case includes a space for the computing device.

9. The peripheral device of claim 1, wherein the peripheral device expands one or more capabilities of the computing device, and wherein the peripheral device is not part of a core computer architecture of the computing device.

10. A method comprising:
    providing a touch-screen display at a multifunctional device;
    providing an external connection capable of connecting to at least one of: a graphical bus of a computing device and an input bus of the computing device; and
    selecting an active mode of the multifunctional device from a plurality of modes of the multifunctional device with a selection module,
    wherein the multifunctional device is operatively dependent on the computing device;
    wherein the modes include a display mode that operates exclusively from an input mode when the display mode is selected and wherein the multifunctional device identifies itself to the computing device as a display when the display mode is selected, and
    wherein the modes include the input mode that operates exclusively from the display mode when the input mode is selected and wherein the multifunctional device identifies itself to the computing device as a dedicated input device and in the input mode the multifunctional device communicates with the computing device independently of the graphics bus when the input mode is selected.

11. The method of claim 10, further comprising:
    determining that the active mode is the input mode;
    displaying a soft keyboard via the touch-screen display;
    receiving, at a soft keyboard controller of the multifunctional device, input information via the touch-screen display;
    determining, at the soft keyboard controller, key information based on the input information; and
    transmitting the key information to the computing device via the input bus.

12. The method of claim 10, wherein the multifunctional device does not include a graphical user interface operating system.

13. A system comprising:
a host device; and
a peripheral device comprising:
   a touch-enabled display;
   an external connection to at least one of: a graphical interface of the host device and an input bus of the host device; and
   a selection module to select one mode from a plurality of modes of the peripheral device,
wherein the peripheral device is caused to transmit identification information to the host device based on the one mode,
wherein the modes include a first mode that is a display operational mode that operates exclusively from a second mode when the first mode is selected and wherein the identification information indicates that the peripheral device is a display when the first mode is selected, and
wherein the modes include the second mode that is an input operational mode that operates exclusively from the first mode when the second mode is selected and wherein the identification information indicates that the peripheral device is a keyboard and in the second mode the peripheral device communicates with the host device independently of a graphics bus of the host device when the second mode is selected.

14. The system of claim 13, wherein the peripheral device is not part of a core computer architecture of the host device and wherein the peripheral device is functionally dependent on the host device during the first mode or the second mode.

15. The system of claim 13,
wherein the second mode is the one mode,
wherein the peripheral device further comprises a soft keyboard controller,
wherein the touch enabled display is caused to present a soft keyboard,
wherein the soft keyboard controller receives input via the touch-enabled display,
wherein the soft keyboard controller converts the input into key information, and
wherein the key information is transmitted to the host device via the input bus.

16. The peripheral device of claim 1, wherein in the input operational mode the peripheral device communicates with the computing device independently of the graphics bus.

17. The peripheral device of claim 1, further comprising a switch that is configured to implement the selection module selecting between the exclusively operating input operational mode and the exclusively operating display operational mode.

18. The system of claim 13, further comprising a switch that is configured to implement the selection module selecting between the exclusively operating input operational mode and the exclusively operating display operational mode.

19. The system of claim 18, wherein the switch includes a magnetic switch on the peripheral device that can be engaged via proximity to the host device.

\* \* \* \* \*

UNITED STATES PATENT AND TRADEMARK OFFICE
CERTIFICATE OF CORRECTION

PATENT NO.         : 8,856,393 B2
APPLICATION NO.    : 13/092730
DATED              : October 7, 2014
INVENTOR(S)        : Akihiko Ikeda Page 1 of 1

It is certified that error appears in the above-identified patent and that said Letters Patent is hereby corrected as shown below:

In the Claims,

In column 12, line 7, in Claim 15, delete "touch enabled" and insert -- touch-enabled --, therefor.

Signed and Sealed this
Twenty-fourth Day of February, 2015

Michelle K. Lee
*Deputy Director of the United States Patent and Trademark Office*